Sept. 15, 1959

B. KRALOWETZ

2,903,923

STRETCH-FORGING MACHINE

Filed Sept. 18, 1956

Sept. 15, 1959      B. KRALOWETZ      2,903,923

STRETCH-FORGING MACHINE

Filed Sept. 18, 1956      7 Sheets-Sheet 4

Sept. 15, 1959 B. KRALOWETZ 2,903,923
STRETCH-FORGING MACHINE
Filed Sept. 18, 1956 7 Sheets-Sheet 6

FIG.16

United States Patent Office 2,903,923
Patented Sept. 15, 1959

2,903,923

STRETCH-FORGING MACHINE

Bruno Kralowetz, Steyr, Austria

Application September 18, 1956, Serial No. 610,588

5 Claims. (Cl. 78—20)

Forging machines are known in which connecting rods are provided as carriers for the hammer tools which are provided around the periphery of the workpiece, which may be rotating. These connecting rods are driven by means of eccentrics and their drive shafts are eccentrically carried in rotatably adjustable bushings. The rotary adjustment of the bearing bushings of the drive shafts serves to vary the stroke position of the connecting rods, i.e. to set the depth of penetration of the hammer tools in order to provide for the desired cross-sectional dimensions of the workpiece. The axes of the drive shafts of the connecting rods and the axes of the bearing bushings have previously been parallel to the workpiece axis so that the hammers formed by the connecting rods with the inserted hammer tools inserted therein move in a plane which is normal to the workpiece axis and a special device is required for the axial feed of the workpiece. Whereas these known forging machines are suitable for cylindrical forging work, for forging work recesses and collars, with high dimensional accuracy, they are not suitable for stretch forging, i.e. for great reductions in cross-section.

The larger the impinging hammer face and the thinner the material to be stretched the smaller will be the flow of material in the longitudinal direction of the workpiece because the influence of the adhesive friction between the hammer face and the workpiece surface, which obstructs a flow of material, increases progressively. In order to enable a substantial stretching of workpieces of small thickness in the previous forging machines it was necessary to use hammer tools which are very narrow in the direction of stretch. This is possible only to a certain limit because otherwise the hammers penetrate into the workpiece to form recesses which scars that can hardly been smoothened and whose rear edges may merely be bent over in the feed direction, by the following blow, with a possibility of cracks forming, whereas no flow of material occurs.

It is an object of the invention to provide a forging machine of the type described, which is particularly suitable for stretching bars and tubes or the like and which is simplified in construction because a separate device for axially feeding the workpiece is eliminated.

The forging machine according to the invention is essentially characterized in that the axes of the drive shafts for the connecting rods and the axes of the bearing bushings extend in a plane which is normal to the workpiece axis and the connecting rods extend slidably through rotatable guide members so that the hammer tools which are rigidly affixed to the protruding connecting rod ends perform not only a thrust movement towards the workpiece but also a pivotal movement about the axes of rotation of the guide members and substantially in the longitudinal direction of the workpiece, whereby the workpiece is automatically pulled in. Thus the hammer tools will penetrate into the workpiece, roll along the workpiece so as to move the same along in its longitudinal direction, and withdraw out of the workpiece, all in one hammer blow. Such a forging operation is similar to rolling. It is known that workpieces of small thickness may be considerably stretched by rolling because in the rolling operation the effect of the adhesive friction between the tool surface and the workpiece surface on the flow of material is eliminated owing to the rotation of the rolls, and the fact that the contact surfaces have the least extent in the direction of stretching. For this reason it is clear that if these conditions are applied according to the invention to a forging operation considerable advantages will be achieved over the previously usual forging operation. These advantages reside in a great flow of material in the longitudinal direction of the workpiece, resulting in a great reduction in cross-section also with workpieces of small thickness, and an automatic feed of the material in it axial direction by the forging hammers themselves without a separate feed device.

In a development of the invention the guide members in which the connecting rods are slidably received are jointly adjustable in directions which are radial to the workpiece axis. As a result of that radial adjustment the distance of the axis of rotation of the guide members or of the pivotal axis of the connecting rods from the axis of the drive shaft is varied so as to control the swing of the connecting rods. When the guide members are at a great distance from the workpiece axis whereas the guide member axes are close to the axes of the drive shafts and the connecting rods protrude to a great extent out of the guides on the side facing the workpiece, the connecting rods will perform a large swing movement in the longitudinal direction of the workpiece and a large axial feed of the workpiece will result. The adjustment of the guide members in the opposite direction (towards the workpiece) will then vary the swing of the connection rods and the amount of feed. It is clear that a joint, equal adjustment of the guides of all connecting rods is necessary to achieve like movements for all connecting rods. In any case that radial adjustment of the guides enables of an additional adaptation to the nature of the workpiece and to the desired forging operation even during the operation of the machine.

To enable a joint adjustment of the guide members with small structural expenditure they are rotatably inserted in bearing members which are radially slidable relative to the workpiece axis. These bearing members are formed with an oblique groove or the like, in which a block is slidable and the sliding blocks of the bearing members are affixed to a common adjusting ring. Rotation of the adjusting ring will cause the sliding blocks affixed thereto, which slide in the oblique grooves of the bearing members, to displace the latter in one direction or the other, whereby the guide members rotatably inserted in the bearing members are also radially adjusted towards or from the workpiece. The bearing members are affixed in position by wedges or the like which can be pneumatically or hydraulically applied to them so that an undesired adjustment during the operation of the machine is prevented.

According to the invention the profile of the hammer tools, considered in the longitudinal direction of the workpiece, is composed of a relatively long smoothing profile, which corresponds to the curve along which the hammer end rolls on a straight line, and, with a gradual transition, a shorter, more highly curved shaping profile on the workpiece approach side. That hammer profile corresponds to the hammer movement and does not only ensure a great reduction of the cross-section when the shaping profile enters the workpiece, but also a smoothing of the workpiece by the subsequently effective rolling profile.

Two mutually opposite hammers or three or more hammers which are evenly spaced around the periphery of the workpiece may be provided, as required. It is particularly suitable to arrange four hammers which are spaced by 90 deg. because this enables the shaping of the most important cross-sectional shapes, namely circular or circular-ring shapes (if the workpiece is rotated about its axis during the forging operation), as well as rectangular, square or four cornered shapes. In this connection it is of advantage if the adjustment of the bearing bushings for the drive shafts for each pair of diametrically opposite hammers can be effected jointly and, if desired, separately from that of the two other bearing bushings. If only a joint angular adjustment of the bearing bushings of all four hammers was possible, the depth setting of all four hammers could only be varied jointly and it would only be possible to forge various circular or square cross sections, within the limits determined by the eccentricity of the drive shafts in the bearing bushings, whereas rectangular cross-sections could not be obtained.

The movement of one of the pairs of two mutually opposite hammers leads suitably the movement of the other pair of hammers and the hammer tools are somewhat wider than the corresponding maximum side length of the workpiece cross-section. Since the hammer tools extend laterally beyond the workpiece and the hammer faces are of maximum width, the same hammer tools may be used without replacement for making cross-sections of different size, with the additional advantage residing in the forging of sharp edges in the case of four-cornered cross-sections. The larger width of the hammers, however, precludes a simultaneous blowing of all four hammers because they would meet laterally before reaching the workpiece. The staggering of the impact movement of the two pairs of hammers with time (preferably a staggering of the drive eccentrics by 180 deg.) enables the working with a hammer width which is larger than the respective cross-sectional dimension of the workpiece.

To enable the forging machine to shape also hollow workpieces, a forging mandrel is employed in the usual manner, which is arranged in the workpiece between the hammers. In a development of the invention that mandrel can be introduced and retracted through the undeformed workpiece with the aid of a spring-supported bar, which is connected to a compressed-air piston and is pivotally movable about a transverse axis disposed outside the machine housing. For this reason the tube to be forged may easily be pushed on the mandrel outside of the machine housing. Then the tube and mandrel are swung into the correct position and the mandrel is introduced between the hammers by means of the compressed-air piston, where after the tube is moved into position. As soon as the hammers engage the tube the subsequent forging and the further axial feeding of the tube is automatically effected.

Spring-loaded holding jaws for the workpiece are provided adjacent to the inlet opening of the machine housing and desired also in the outlet region. These jaws clamp the workpiece automatically to prevent a spontaneous feed movement and a return movement of the workpiece. The workpiece pulled in and accelerated by the hammers could continue its movement automatically after the hammers have been withdrawn so that unforged parts would remain between the parts of the workpiece which have been worked by the hammer tools. This would result in improper forging. It would also be possible for the workpiece to be pressed back for a certain distance when the hammers impinge, which would also have unfavourable results. The jaws provided according to the invention prevent both effects and thus ensure a perfect forging.

In a development of the invention four holding jaws are provided, which are spaced 90 deg. apart and are pivoted on transverse axes and forced against the workpiece by a common spring by means of thrust pins having parallel axes. The spring acts by means of a balance beam on the thrust pins of two adjacent holding jaws and from said thrust pins the pressure is transmitted without charge by crossing cranks to the thrust pins of the respective diametrically opposite jaws. That construction enables the holding of workpieces of circular cross-section but also of square and rectangular cross-section, the jaws automatically adapting themselves to any cross-sectional shape of the workpiece. Since only one spring is provided, which acts through a movable balance beam on the thrust pins of two adjacent holding jaws and which acts at the same time through the cranks on the respective opposite jaws, all four jaws are always applied with the same force, independently of the distance between the mutually opposite jaws and of the shape and dimensions of the cross-section of the workpiece. This is necessary to ensure the exactly centrical position of the workpeice between the jaws and between the hammers. The initial stress of the spring is variable to enable an adaptation of the force with which the holding jaws are applied to the weight and size of the workpiece to be forged.

The holding jaws, their support, the spring and the force transmitting members form preferably a structural group, which can be driven to rotate about the workpiece axis so as to impart to the workpiece a rotary movement about its longitudinal axis, as is necessary in forging cylindrical tubes or bars to avoid the formation of a burr seam or of eccentricities. The rotatable group may be combined with its housing and drive motor to form a unit which is pivotally mounted to the machine housing on the outside thereof and which is swung away from the inlet opening of the machine housing when the unit is inoperative, whereby an unobstructed access is provided.

A particularly simple construction of the entire machine will be achieved if the workpiece axis is horizontal and the movement planes of the hammers extending through the workpiece axis include an angle of 45 deg. with the base plane of the hammers. It is suitable to divide the machine housing in a vertical centre plane which is transverse to the workpiece axis and to arrange it to be tiltable about a horizontal transverse axis. Thus the entire machine has a minimum overall height and provides for a good access to the internal parts and for easy assembly.

An illustrative embodiment of the invention is shown in the accompanying drawings.

In the subsequent figures the holding jaw unit is shown.

Figure 1:
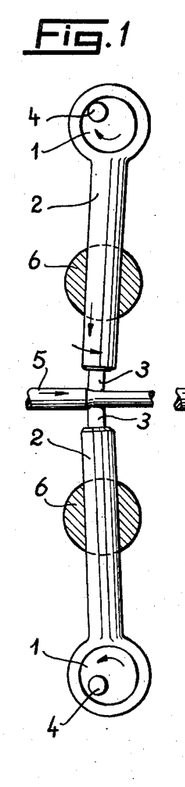
Figs. 1 and 2 illustrate diagrammatically the hammer movement in two characteristic positions of the hammers.
Figure 2:
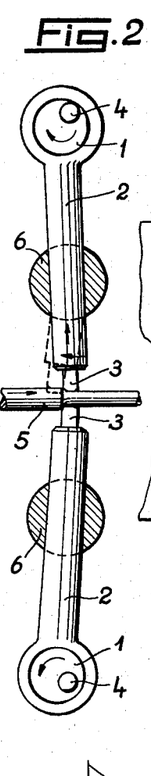
Figure 3:
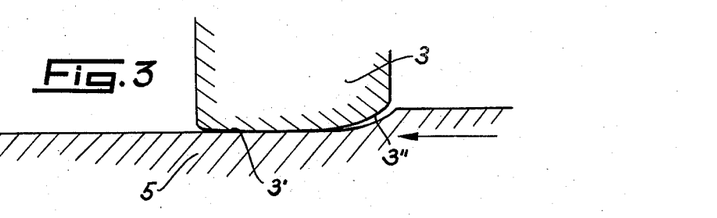
Fig. 3 is an enlarged view showing the profile of the hammer tools.

The hammers of the forging machine are formed by connecting rods 2 which are driven by eccentrics 1 and which have hammer tools 3 inserted at their ends. The drive shafts 4 for the eccentrics 1 or connecting rods 2 are not arranged parallel to the workpiece 5 but the axes of the drive shafts 4 lie in a plane which is normal to the workpiece axis (in Figs. 1 and 2 the axes of the eccentrics 1 and of the drive shafts 4 are normal to the plane of the drawing). Guide members 6 are provided for the connecting rods 2. These guide members are carried so as to be pivotally oscillatable about an axis which is parallel to the axis of the eccentric or drive shaft. For this reason the hammers 2, 3 perform a thrust movement towards and from the workpiece 5 and in addition thereto a swing movement about the axes of the guide members 6 in planes extending through the workpiece axes (in the plane of the drawing of Figs. 1 and 2). According to Fig. 1 the hammers 2, 3, penetrate into the workpiece 5 and roll along the workpiece until they have reached the position according to Fig. 2, where they withdraw from the workpiece to return to their initial position. During that hammer movement the workpiece is moved along and is automatically pulled in. The profile of the hammer tools 3 in the longitudinal direction of the workpiece 5 corresponds to that hammer movement. As is shown in Fig. 3 that profile is composed of a longer smoothing profile 3′, which corresponds to the rolling curve of the hammer end on a straight line, and of a shorter, more highly curved shaping profile 3″ on the workpiece approach side. It is to be understood that a gradual transition is provided from one profile section to the other.

Figure 4:
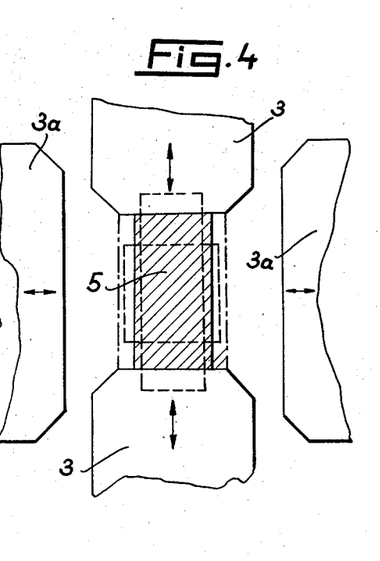
Fig. 4 is an enlarged elevation showing the shape and arrangement of the workpieces for forging four-cornered workpieces.

It is suitable to provide four hammers, which are spaced 90 deg. apart. Fig. 4 shows that the hammer tools 3, 3a are wider than the corresponding side length of the rectangular workpiece 5 so that all rectangular and square cross-sections whose side length is less than the width of the hammer tools can be formed with the same tools, merely by a change of the depth setting or stroke position of the hammers. Thus the cross-sectional shapes shown by way of example with broken and dash-and-dot lines can be produced with the same tools. Fig. 4 shows also, however, that this is possible only if the hammers 3 and 3a do not blow at the same time and the movement of one pair of hammers leads the movement of the other pair of hammers by such an amount that one pair has opened before the other pair closes. It is also necessary to provide for an independent variation of the stroke position of the two pairs of hammers in order to obtain different cross-sectional shapes.

Figure 5:
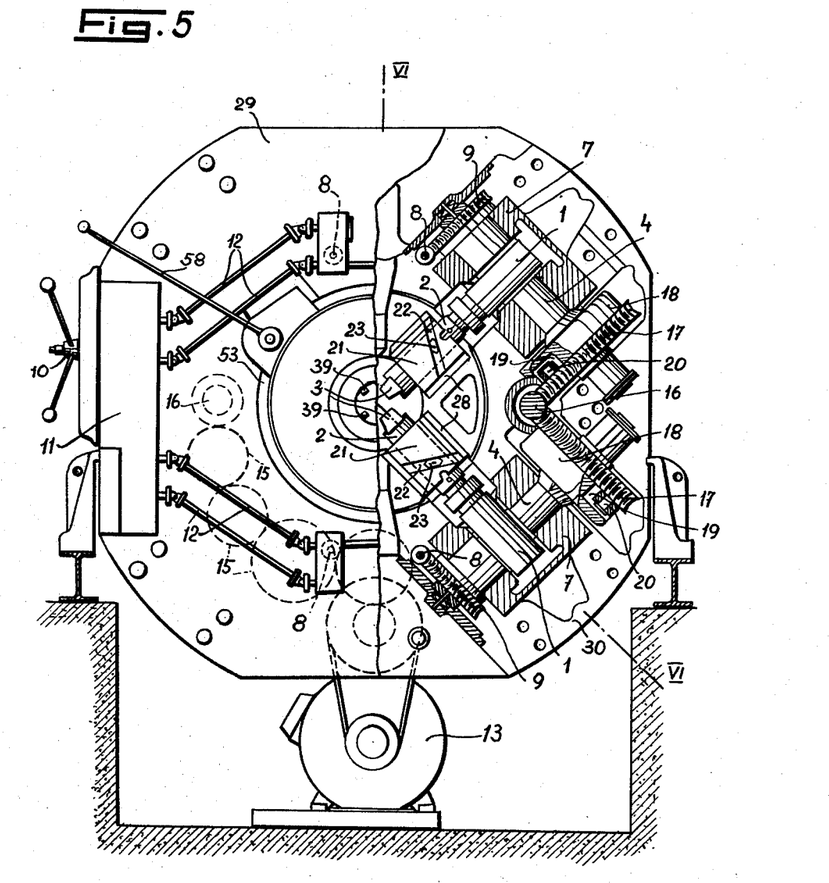
Fig. 5 shows an entire forging machine one half of which is shown in a front view whereas the other half is shown in a central sectional view.

The variation of the stroke position (depth setting) of the hammers to achieve the desired cross-sectional dimensions of the workpiece is enabled because the drive shafts 4 for the eccentrics 1 or connecting rods 2 are eccentrically carried in rotatably adjustable bushings 7 (right-hand half of Fig. 5). A rotation of said bearing bushings will vary the distance of the axes of the eccentrics or drive shaft from the workpiece axis and with it the stroke position of the hammers. The angular adjustment of the bushings 7 is effected with the aid of worms 8, which are in mesh with worm wheels 9 rigid with the bushings 7. If workpieces of round or square cross-section are to be obtained, the worms 8 are jointly rotated by a handwheel 10 through the intermediary of a gear accommodated in a box 11 and of universal-joint shafts 12 and appropriate idler wheels. In the case of rectangular cross-sections the bearing bushings for the two pairs of mutually opposite hammers must be separately adjusted.

A common electric motor 13 is provided for driving the hammers, which drives two worm shafts 16 by means of a V-belt drive and symmetrically arranged idler gears 15 (indicated in broken lines in the left-hand half of Fig. 5) arranged in a box 14. Each of the worm shafts 16 is in mesh with two worm wheels 17, which are not directly carried on the drive shafts 4 of the hammers but are coupled each to a flywheel 18 by a pin 20 guided in a radial groove 19 of that flywheel. The flywheels 18 are keyed to the drive shafts 4. This type of drive connection is necessary because the drive shafts 4 will vary their position relative to the worm wheels 17 during the angular adjustment of the bearing bushings 7. The drive axes and the movement planes of the hammers include an angle of 45 deg. with the base plane to reduce the overall height of the machine.

Figure 6:
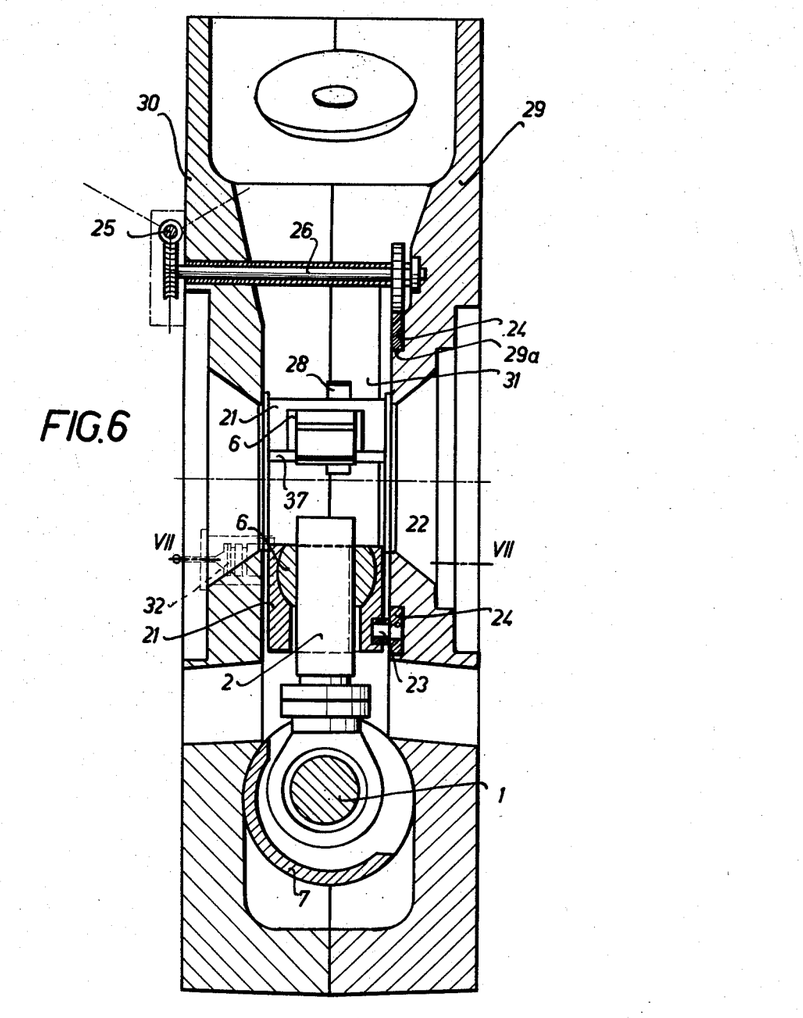
Fig. 6 is a sectional view of the machine taken on line VI—VI of Fig. 5.
Figure 7:
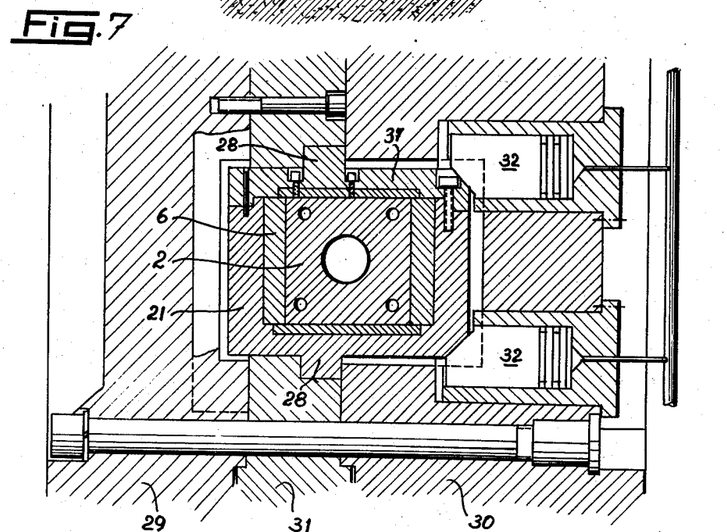
Fig. 7 is an enlarged sectional view of a detail taken on line VII—VII of Fig. 6.

The guides 6 of the connecting rods 2 of the hammers are carried to be not only rotatable but also jointly adjustable in directions which are radial to the workpiece axis in order to vary the swing of the connecting rods 2. To this end the guide members 6 are rotatably inserted in hollow, prismatic bearing members 21, each of which is formed with an oblique groove 22 with a block 23 slidable therein. The sliding blocks 23 are affixed to a common adjusting ring 24, which is toothed on part of its outside periphery and can be rotated by a handwheel 25 through a shaft 26 and appropriate idler wheels (Fig. 6). To enable the insertion of the spherical guide members 6 the bearing members 21 have a side cover 27 (Fig. 7) and have side strips 28, with which they are guided in a direction which is radial to the workpiece axis in an appropriate recess of an insert 31 held between the two halves 29, 30 of the machine housing. The housing part 29 is formed on its inside with an annular step 29a, which forms a seat for the inside periphery of the adjusting ring 24. The bearing members 21 are held in position by wedges 32, which constitute pistons to which compressed air can be applied. After said wedges have been lifted the bearing members 21 can be displaced in one or the other direction, in order to increase or reduce the swing of the connecting rods 2, if the adjusting ring 24 is rotated to cause the sliding blocks 23 to slide in the oblique grooves 22.

Figure 8:
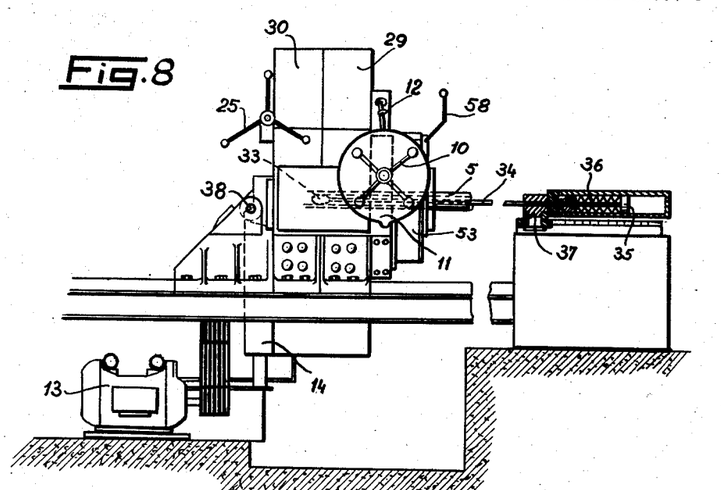
Fig. 8 is a reduced side view showing the forging machine with the mandrel holding device.
Figure 9:
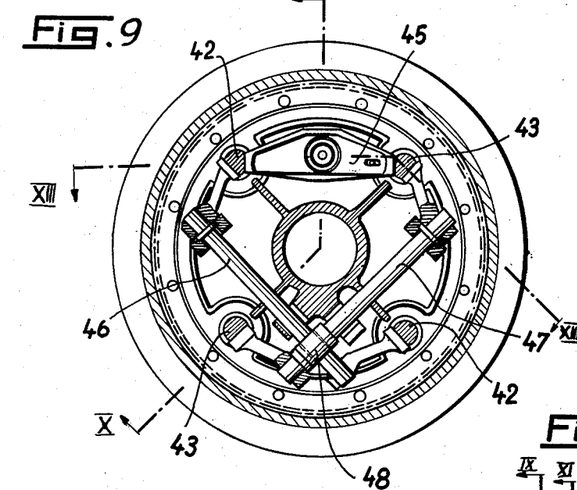
Fig. 9 is a sectional view of the unit taken on line IX—IX of Fig. 10.

A forging mandrel 33 is provided to enable the forging of tubes or other hollow material. This mandrel can be introduced and retracted between the hammers through the undeformed workpiece 5 with the aid of a bar 34 (Fig. 8). To this end the bar 34 is connected to a compressed-air piston 35, and a spring 36 is arranged between the end of the bar and the piston. The bar 34 can also be swung about a vertical transverse pin 37. When it is desired to retract the bar 34 and with it the mandrel 33, compressed air is applied to the piston 35, whereafter the bar is swung to the side and a new workpiece can be pushed on the mandrel. Thereafter the bar and mandrel are swung back together with the workpiece and compressed air is applied to the other end of the piston 35 to advance the mandrel between the hammers. Then the workpiece is inserted by hand between the hammers, whereafter the further forging operation, including the axial feed of the workpiece, is automatically effected.

The machine housing 29, 30 is divided in a vertical centre plane which extends transversely of the workpiece axis and can be swung about horizontal transverse pins 38 in order to facilitate the assembly and disassembly.

Figure 13:
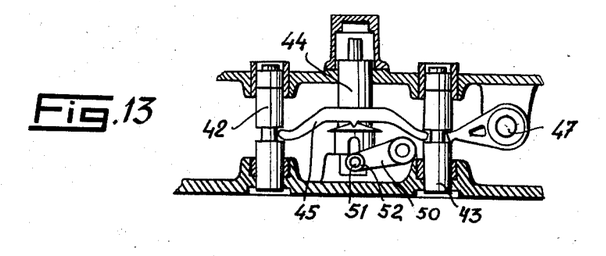
Fig. 13 is a sectional view taken on line XIII—XIII of Fig. 9.
Figure 16:
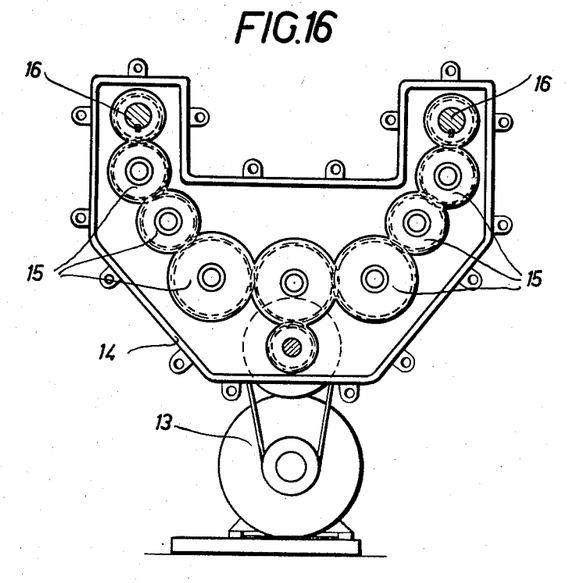
Fig. 16 shows the hammer drive arrangement.

When viewed in the direction of its feed movement, the workpiece is held before the hammers by a clamping device for automatically clamping the workpiece to prevent a spontaneous feed movement of the workpiece as well as a return movement thereof and for centering the workpiece. This clamping device comprises at least two, preferably four jaws, corresponding to the number of hammers. Each of these jaws 39 is pivoted on one of the pivots 40, which are regularly spaced around the workpiece and extend transversely to the longitudinal direction of the workpiece. The jaws 39 are arranged so that they tend to be pivotally moved more closely together to increase the clamping force exercised by them on the workpiece upon a return movement of the workpiece. To this end the jaws 39 engage the workpiece at regularly angularly spaced points, which lie behind the pivots 40 when viewed in the direction of the feed movement of the workpiece. The jaws 39 are forced against the workpiece by a common spring 41 by means of thrust pins 42, 43 having parallel axes. The spring 41 acts on a slidable sleeve 44, which supports a balance beam 45, which is in engagement with the thrust pins 42, 43 of the upper adjacent holding jaws 39. If a workpiece having a rectangular cross-section is inserted between the jaws to swing the respective adjacent jaws and retract the thrust pins 42, 43 by different amounts, the balance beam 45 will assume an inclined position without varying the transmission of force from the spring 41 (see particularly Fig. 13). The thrust pins 42, 43 of the two other jaws are positively connected by crossing cranks 46, 47 to the upper thrust pins. All crank pins are of equal length so that the force and movement are transmitted without charge to the two opposite jaws and their thrust pins. The crank 46 extends through a wide aperture 48 of the crank 47 so that the rotation of the cranks is not hindered. The arrangement of the crossing cranks couples the diametrically opposite jaws or their thrust pins and ensures that the jaws are always equally radially spaced from the workpiece axis, whether workpieces of rectangular, round or square cross-section are concerned, all four jaws being applied with the same force against the workpiece.

Figure 10:
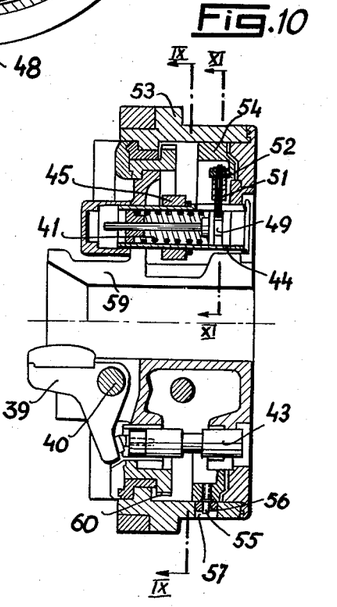
Fig. 10 is a sectional view taken on line X—X of Fig. 9.
Figure 11:
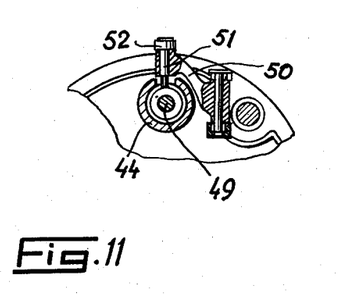
Fig. 11 is a sectional view taken on line XI—XI of Fig. 10.
Figures 12, 14, 15:
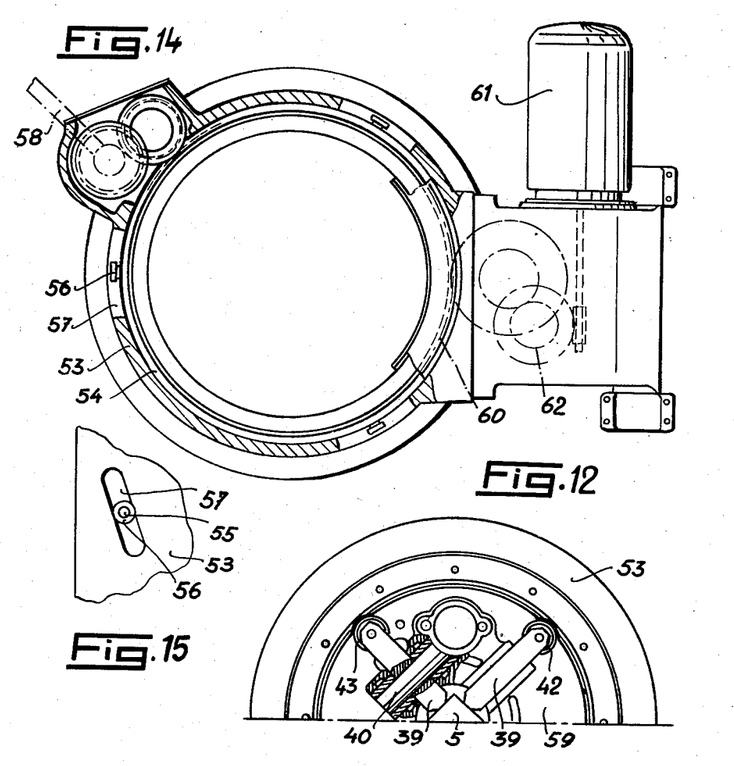
Fig. 12 is an elevation showing the side of the unit facing the forging machine.
Fig. 14 is a partly sectional front view of the housing of the unit.
Fig. 15 is a side view showing a detail.

In order to enable an increase or reduction of the force with which the holding jaws 39 are applied the initial stress of the spring 41 is variable. The spring 41 bears on a piston 49, which is slidable in the sleeve 44 and which receives and is engaged by a pin 51, which is affixed to a pivoted arm 50 and carries a roller 52 (Figs. 10 and 11). When the pin 51 is displaced in the direction of the axis of the spring the piston 49 is adjusted, whereby the spring 41 is more or less compressed. That displacement of the pin 51 is effected owing to the engagement of its roller 52 with a ring 54, which is capable of a limited rotation and axial displacement in the housing 53. The ring 54 has radially outwardly directed pins 55 with rollers 56, which are guided in oblique slots 57 of the housing 53 (Figs. 10 and 14, 15). As soon as the ring 54, which is toothed on part of its periphery, is rotated with the aid of the hand lever 58 and appropriate gears (Fig. 14), the guidance of its radial pins 55 or rollers 56 in the oblique slots 57 of the housing 53 will cause the ring to be axially adjusted, resulting in a displacement of the pin 51 carried by the pivoted arm 50 and of the piston 49 so as to vary the initial stress of the spring 41.

The holding jaws 39, their support 59, the spring, the force transmitting members etc. form a structural group which is rotatable in the housing 53 and is formed with a toothed rim 60. That structural group can be rotated by a motor 61 by the intermediary of an appropriate gear 62, which acts on the toothed rim 60, in order to rotate the workpiece held by the holding jaws during the forging operation, whereby neatly cylindrical workpieces are obtained. This rotatable arrangement of the structural group necessitates also the special construction for varying the initial stress of the spring 41. During the rotation of the structural group the roller 52 of the pin 51 can roll along the ring 54 without any sliding friction and it is quite possible to adjust the ring 54 during the rotation in order to vary the initial stress of the spring as required during operation.

The said rotatable structural group together with the housing 53, the drive motor 61 and the gear 62 form a unit, which is pivoted on to the machine housing on the outside thereof and which can easily be removed from the inlet opening of the machine if it is not used. It is possible without difficulty and recommendable in forging cylindrical work to provide at the rear end of the machine a similar unit (not shown), which comprises a clamping device such as 39—58 for clamping the workpiece after it has been forged by the hammers.

I claim:

1. A machine for stretch-forging elongated workpieces, comprising a plurality of rotatable guide members, a plurality of connecting rods each of which extends slidably through and is guided by one of said guide members and has two end portions projecting in opposite directions out of said guide member, a plurality of hammer tools each of which is rigidly affixed to one of said connecting rods at one of said end portions thereof, a plurality of eccentrics each of which is rotatably arranged in one of said connecting rods at the other of said end portions thereof, a plurality of drive shafts each of which carries one of said eccentrics, a plurality of rotatably adjustable bushings each of which has one of said drive shafts eccentrically carried therein, the axes of said drive shafts and bushings lying in a plane which is normal to the longitudinal axis of the workpiece, and means for rotating said drive shafts to cause said hammer tools to perform a thrust movement toward the workpiece and a swing movement about the axis of rotation of the guide members and substantially in the longitudinal direction of the workpiece, whereby said workpiece is automatically pulled in between said hammer tools by the hammer tools themselves.

2. A machine as set forth in claim 1, which comprises a plurality of bearing members which are slidable in directions which are radial to the workpiece axis and have said guide members rotatably inserted therein, and a plurality of fluid-pressure operable pistons each of which has a wedge-shaped portion adapted to engage one of said bearing members under the action of fluid pressure on said piston to hold said bearing member in position.

3. A machine for stretch-forging elongated workpieces, comprising a plurality of rotatable guide members, a plurality of connecting rods each of which extends slidably through and is guided by one of said guide members and has an end portion projecting out of said guide member, a plurality of hammer tools each of which is rigidly affixed to said projecting end portion of one of said connecting rods, a plurality of eccentrics each of which is rotatably arranged in one of said connecting rods, a plurality of drive shafts each of which carries one of said eccentrics, a plurality of rotatably adjustable bushings each of which has one of said drive shafts eccentrically carried therein, the axes of said drive shafts and bushings lying in a plane which is normal to the longitudinal axis of the workpiece, means for rotating said drive shafts to cause said hammer tools to perform a thrust movement toward the workpiece and a swing movement about the axis of rotation of the guide members and substantially in the longitudinal direction of the workpiece, whereby said workpiece is automatically pulled in between said hammer tools by the hammer tools themselves, and means operatively connected to said bushings and operable during the operation of the machine for rotatably adjusting said bushings.

4. A machine for stretch-forging elongated workpieces, comprising at least two pairs of diametrically opposed hammer tools, which are regularly angularly spaced apart, a plurality of connecting rods each of which has one of said hammer tools rigidly affixed thereto, a plurality of eccentrics each of which is rotatably arranged in one of said connecting rods, a plurality of drive shafts each of which carries one of said eccentrics, a plurality of rotatably adjustable bushings each of which has one of said drive shafts eccentrically carried therein, means for rotating said drive shafts to cause said hammer tools to perform a thrust movement toward the work piece, and a plurality of mutually independent adjusting means, each of which is operatively connected to both bushings associated with one of said pairs of hammer tools and operable to effect a joint rotary adjustment of said bushings to which it is operatively connected independently of the others of said bushings.

5. A machine as set forth in claim 1, which comprises a plurality of bearing members which are slidable in directions which are radial to the workpiece axis and have said guide members rotatably inserted therein, each of said bearing members being formed with an oblique groove, an adjusting ring, and a plurality of sliding blocks which are affixed to said adjusting ring and each of which is slidably received in one of said grooves.

References Cited in the file of this patent

UNITED STATES PATENTS

| | | |
|---|---|---|
| 952,298 | Berg | Mar. 15, 1910 |
| 1,617,890 | Abbey | Feb. 15, 1927 |
| 1,819,376 | Muller | Aug. 18, 1931 |
| 1,841,920 | Smith | Jan. 19, 1932 |
| 1,894,800 | Stowe | Jan. 17, 1933 |
| 2,058,556 | Blair | Oct. 27, 1936 |
| 2,249,688 | Conner | May 6, 1941 |
| 2,410,742 | Newall | Nov. 15, 1946 |
| 2,562,643 | Saxer | July 31, 1951 |
| 2,656,744 | Saxer | Oct. 27, 1953 |
| 2,793,548 | Kralowetz | May 28, 1957 |

FOREIGN PATENTS

| | | |
|---|---|---|
| 143,141 | Australia | Aug. 30, 1951 |
| 527,923 | France | Aug. 5, 1921 |
| 688,587 | Great Britain | Mar. 11, 1953 |